United States Patent [19]
Dietzen

[11] Patent Number: 5,190,085
[45] Date of Patent: Mar. 2, 1993

[54] APPARATUS FOR CHANGING AND RECYCLING VEHICLE FLUIDS

[76] Inventor: Gary Dietzen, 110 Stonewood Cir., Lafayette, La. 70508

[21] Appl. No.: 832,114

[22] Filed: Feb. 6, 1992

[51] Int. Cl.⁵ .............................................. F16N 31/00
[52] U.S. Cl. ........................................ 141/98; 141/86;
141/106; 141/331; 141/375; 184/1.005;
184/106; 220/573
[58] Field of Search ................. 220/573; 184/1.5, 106;
141/331, 332, 333, 334, 106, 98, 86, 375

[56] References Cited

U.S. PATENT DOCUMENTS

| | | | |
|---|---|---|---|
| 3,643,704 | 2/1972 | Carr | 141/106 |
| 4,054,184 | 10/1977 | Marcinko | 184/1.5 |
| 4,099,598 | 7/1978 | Clinard | 184/106 |
| 4,114,660 | 9/1978 | Arruda | 141/98 |
| 4,164,306 | 8/1979 | Perrin | 141/375 X |
| 4,301,841 | 11/1981 | Sandow | 141/98 |
| 4,332,282 | 6/1982 | Strange | 141/1 |
| 4,488,584 | 12/1984 | Hestehave et al. | 141/339 |
| 4,697,670 | 10/1987 | Arruda | 184/1.5 |
| 4,702,290 | 10/1987 | Perez | 141/332 |
| 4,832,095 | 5/1989 | Bonnell | 141/106 |
| 4,832,947 | 4/1989 | Maynard, Jr. | 220/572 X |
| 5,082,035 | 1/1992 | Maxwell | 141/98 |

Primary Examiner—Ernest G. Cusick
Attorney, Agent, or Firm—Pravel, Gambrell, Hewitt, Kimball & Krieger

[57] ABSTRACT

A vehicle fluids change and recycle apparatus includes a vessel body having an interior reservoir for containing oil drained from an engine. The body includes parallel and rear surfaces on opposite sides of the interior reservoir. The vessel body includes an inlet for enabling draining oil to enter the reservoir at the front surface of the vessel body. The lower end of the vessel body has a pedestal for enabling the vessel body to be supported in an upright position wherein the front and rear surfaces are generally vertical. An outlet member defines a drain for emptying the reservoir when the vessel is upright and a valve controls flow from the reservoir via the outlet. The valve is spaced above the pedestal when the vessel body is upright enabling a container to be placed under the valve when the vessel body is upright so that drained engine oil can be recycled into such container.

18 Claims, 4 Drawing Sheets

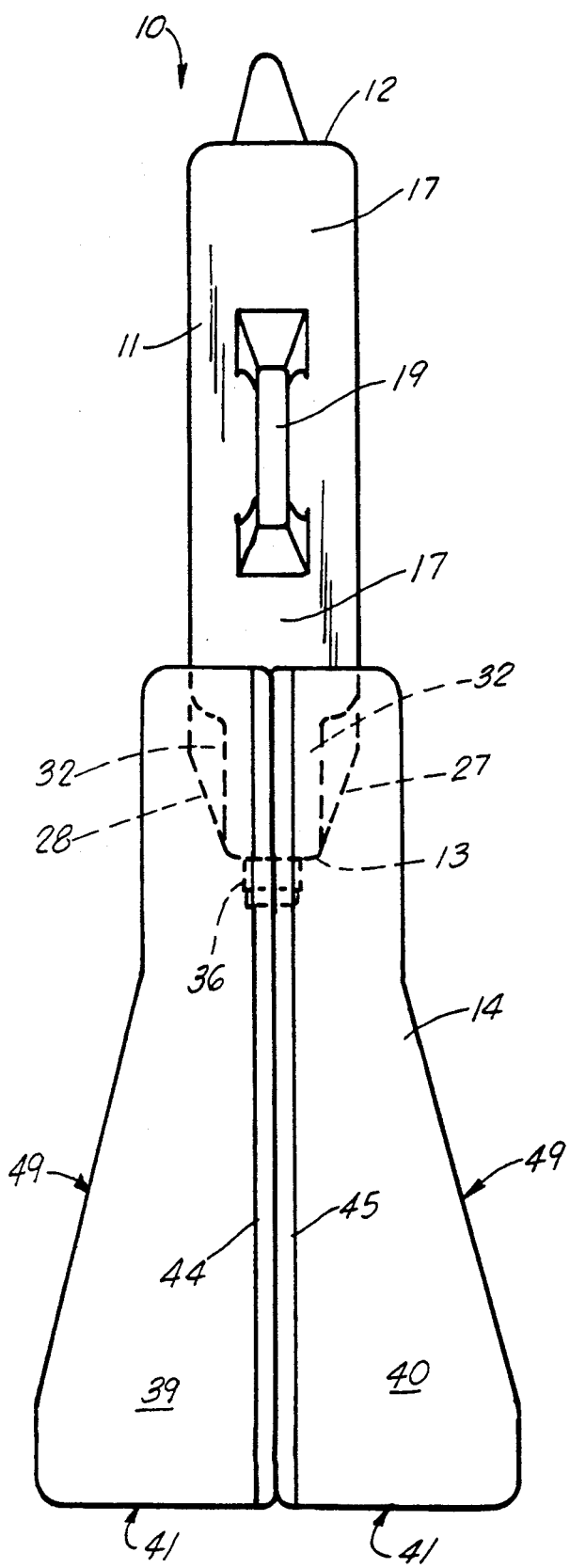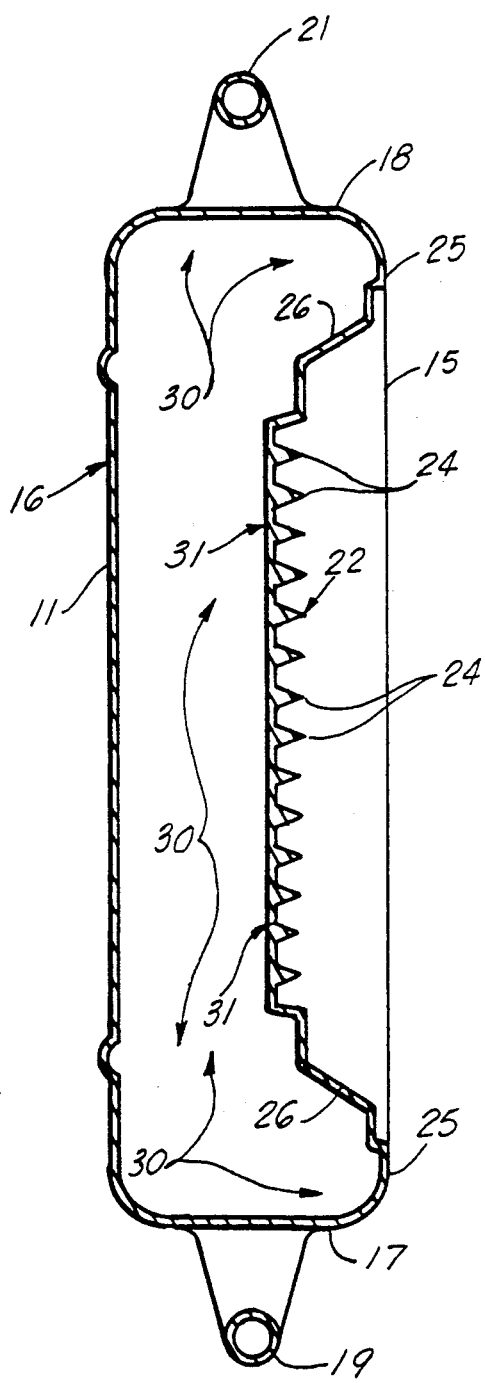
FIG. 2
FIG. 3

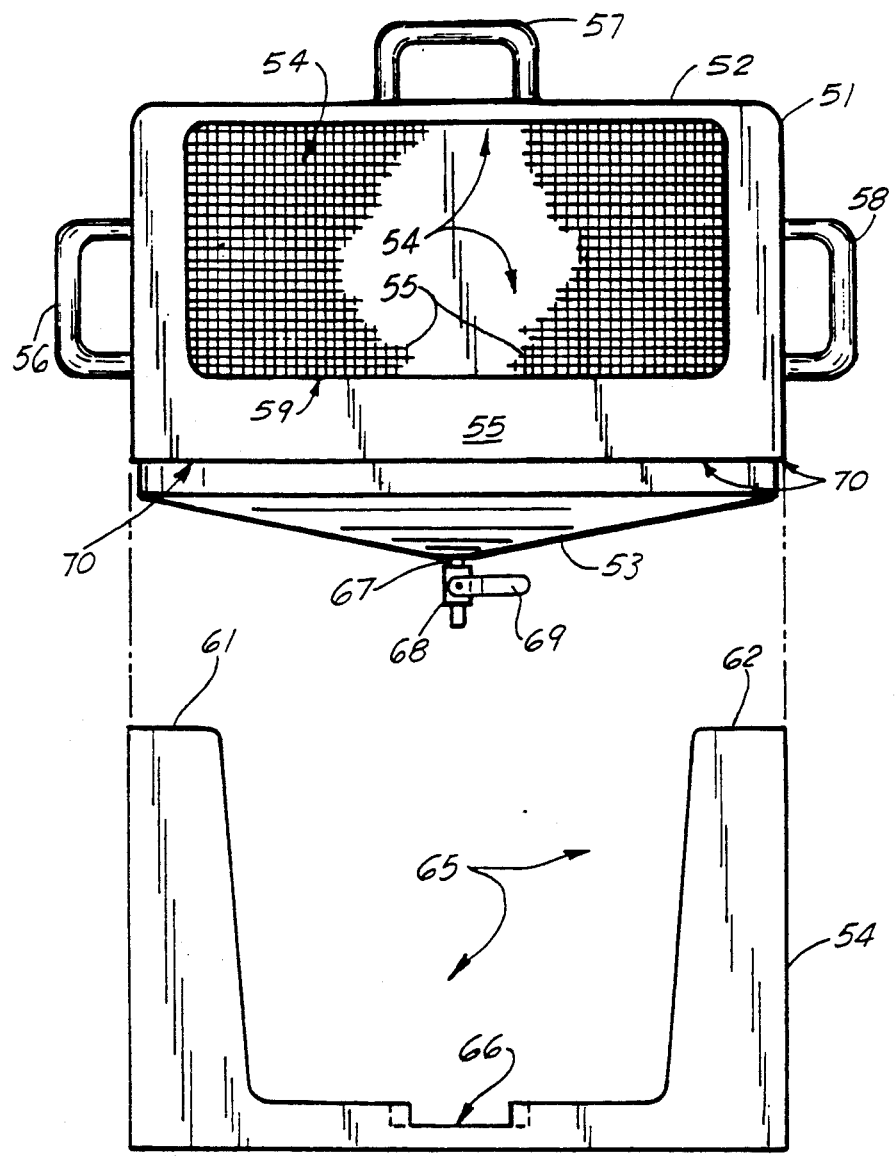
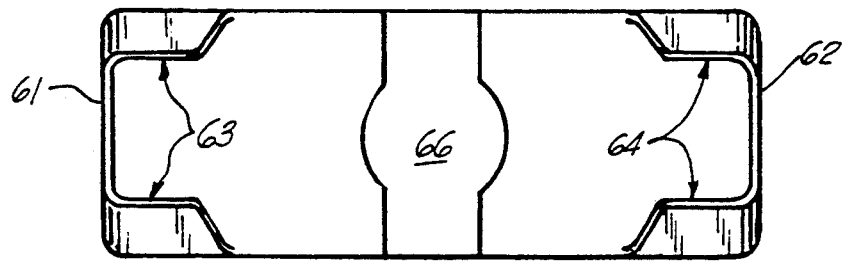
FIG. 4
FIG. 5

APPARATUS FOR CHANGING AND RECYCLING VEHICLE FLUIDS

BACKGROUND OF THE INVENTION

1. Field Of The Invention

The present invention relates to devices for collecting vehicle fluids such as automobile engine oil and for recycling same into the original oil containers. Even more particularly, the present invention relates to an improved oil change container apparatus that includes a vessel having a reservoir with the vessel being adapted to assume a generally horizontal position during draining of the oil from the engine and a generally vertical position during a recycling of the collected engine oil into small containers such as the commonly used quart oil containers.

2. General Background

Many vehicles such as automobiles, trucks, fork lifts, lawn mowers and the like use common engine oil that must be changed on a regular basis. A typical interval for changing the oil of an automobile engine is three to five thousand (3,000-5,000) miles or three to five (3-5) months as an example. Engine oil can be changed at a facility that has a very large reservoir for containing large quantities of the engine oil so that it can be recycled at a later date. This is true of most automobile service stations, most automobile dealerships, and specialty quick-change service companies that typically only change engine oil in a very short period of time and at minimal expense.

Many individuals prefer to change their own engine oil because of the desire to control the quality of oil that is used, the time interval between oil changes, and simply for the convenience of changing engine oil at the home and in minimum time and with lesser expense. An environmental problem is created when individuals change engine oil and do not dispose of it properly. One of the most common and yet environmentally disastrous consequences of engine oil changes at the home involves the practice of draining the engine oil directly onto the earth's surface. While such a practice can be done in the remote corner of one's property, and covered with sand or gravel so as not to leave any visible scar, the engine oil seeps downwardly into the underlying soil, polluting the water table.

Engine oil can be carried by rain water into drainage ditches, storm sewers, and the like where it creates a very high chemical oxygen demand in lakes, rivers, and other bodies of water. This problem is compounded by the fact that thousands of individuals in any particular city dispose of their engine oil directly onto the earth's surface or into drainage ditches, storm sewers or the like. A very small amount of engine oil pollutes a tremendous volume of fresh water. As an example, a single quart of engine oil that is dumped into a lake, river, drainage ditch or the like fouls and pollutes hundreds and possibly thousands of gallons of water.

One of the problems with the changing of engine oil at the home is that the individual is presented with a rather messy job once engine oil is drained into an open bucket or pan. The individual must transfer the oil to individual containers in which the oil wa supplied such as one quart containers, by using a pouring spout, funnel, or like device. This procedure can spread engine oil over the drain pan onto the hands and clothing of the individual, and frequently oil can spill onto the sides of the container being used to recycle the oil. The user is required to often clean up the spilled oil using rags which must be disposed of, using clean water to wash clothes and hands generating a pollution problem.

Various devices have been patented which incorporate containers that are adapted to lay in a generally horizontal position for the purpose of collecting engine oil.

As an example, U.S. Pat. No. 4,488,584 issued to Hestehave; U.S. Pat. No. 4,301,841 issued to Sando; U.S. Pat. No. 4,802,599 issued to Hill; and U.S. Pat. No. 3,410,438 issued to Barts are all very similar devices that incorporate a generally rectangular container which lays on its side to collect oil and has an end cap which can be unscrewed to drain oil from the top of the container. There is commercially available a rectangular container that is also adapted to lay in a sideways or horizontal position and collect engine oil through the side of the container with a closure member to seal the side opening and with an end outlet having an end cap which can be used to dispense oil from the container once collected. These devices, lack any precise means of controlling flow from the container and therefore frequently result in a messy overflow of oil onto the containers that are receiving the recycled oil as well as onto the hands of the user and/or the surrounding soil or garage floor.

The Hestehave patent 4,488,584 has a removable screen which keeps the oil drain plug or oil filter from falling into the container. Once the container is filled, the screen can be removed and a screw end cap closes the container. The container can be transported with the recycled oil therein and by removing the end cap oil can be drained by tipping the container.

The Barts patent 3,410,438 discloses a rectangular container having a handle and an end cap at one end which lays flat and which receives draining oil from an engine into a small concave shaped opening located on the side of the container. A screen is used to keep the oil drain plug from falling into the container. Once the container is filled, the container can be tipped to drain recycled oil through a capped end portion on the top side of the container.

The Sando patent 4,301,841 discloses a rectangular container which has a concave side for oil to drain into the container while laying on its side. A plug is positioned to keep oil from coming back out of the container as it is tipped. This container has a handle and a capped end on the top of the container which pours oil out once you invert the container for draining.

The Hill patent 4,802,599 shows a rectangular container with a capped end on the side at one end of the container. When in the receiving position, there is a snap-on funnel plate which directs oil through the capped version of the container. Once oil draining is completed, the snap-on funnel is taken off and a cap is screwed into the hole. When draining oil from the container, the container must be tipped upside down and drained through the cap outlet.

The Maynard patent 4,823,947 shows a small oil container with a circular top having a screen to collect the oil drain plug and allow an oil filter to rest thereon for draining. It also provides a screw-on cap at one end portion so that the container can be inverted and the oil drained.

U.S. Pat. No. 5,332,282 to Strange has a round drain pan with a funnel arrangement at one end. Using valves, oil enters a funnel section and then another valve at the end of the funnel allows oil to be drained into a recycling container such as a oil quart can.

The Eastom patent 4,974,647 disclosed a round oil drain tub. When the oil drain pan is filled, there is a top portion which has a funnel on one side. By snapping on the lid, the device can be inverted so that oil will drain out through the funneled spout. The Cody patent 4,987,973 discloses an automobile servicing system which uses a conveyer belt that moves an automobile over a surface pit area for servicing. Part of the system includes an oil catch pan for collecting used motor oil. The pan includes a drain on one side where used oil can drain from the pan down into a collecting chamber. Drain line includes a hose connecting the two containers.

Applicant is aware that certain prior art items of glassware and labware (such as burets, graduated cylinders, and funnels) use valves or stopcocks to meter flow into another container.

SUMMARY OF THE PRESENT INVENTION

The present invention provides an improved apparatus for collecting and recycling vehicle fluids from an automobile or small equipment. The apparatus includes a vessel body designed to slide under a car or vehicle to collect oil or other vehicle fluids. An interior reservoir portion is provided for collecting oil as it drains from an engine. The vessel body has parallel front and rear surfaces on opposite sides of the interior reservoir. The vessel body includes a wide inlet portion for enabling the draining oil to enter the reservoir on the front surface of the vessel body yet prevent splash or spill of fluids. The lower end of the vessel body provides a foot or pedestal for enabling the vessel body to be supported in an upright, generally vertical position wherein the front and rear surfaces are also generally vertical. The base or foot can be a separate structure holding a reservoir or pan portion upright during use.

A splash deflection screen serves to keep a vehicle drain plug from falling into fluids and provide a support for the oil filter for draining purposes. The screen is actually a network of parallel bars which have a triangular-shaped cross-section with the apex at the top to deflect liquids into the container instead of splashing outward.

Handles on three (3) sides of the container provide ease of positioning and assist in the proper pickup and insertion of the container into the base for draining oil into the original quart bottles. The handle on top also has a notch cut out to enable hanging of container on a wall for storage or draining of fluids.

An outlet member defines a drain for emptying the reservoir when the vessel is in the upright vertical position.

The vessel body has a closed wall portion that contains oil below the inlet area when the vessel is upright. In this manner, oil does not spill from the inlet when the vessel body is placed in an upright position. Rather, the closed wall structure is sized to accommodate the oil capacity of the particular vehicle such as carrying about 5–10 quarts of oil for example. A ten quart capacity would be provided for an example by the closed wall structure when the vessel body is in an upright position. This ten quart capacity would exceed the 5–8 quarts of oil that are typically used on passenger automobiles. The apparatus could be made larger for accommodating other pieces of equipment if desired which use a higher capacity of oil in the crank case. A valve at the outlet member controls flow from the reservoir so that an individual can meter oil into recycling containers such as for example the original one quart containers in which the oil is packaged and shipped by the original manufacturer (and others such as gallon jugs, etc.).

The valve is spaced above the base when the vessel body is upright, enabling the container to be placed under the valve so that the drained engine oil can be recycled into the container, when the container is placed under the valve and above the foot. The container preferably has a ball-type valve for accurate regulation of the flow of fluids and enables immediate termination of flow when containers are full to prevent spillage or overfill. The valve is detachable and replaceable as needed.

In the preferred embodiment, the closed wall portion has an edge that communicates with one side of the inlet area;

In the preferred embodiment, the vessel body has a wall portion that surrounds the inlet area when the body is placed in a horizontal position.

In the preferred embodiment, the inlet area includes a perforated screen member having multiple openings that allow draining oil to flow through the openings and into the reservoir.

In the preferred embodiment, the vessel body includes a pair of generally opposite side walls each being smaller in width than the width of the front and rear walls.

There is no need for funnels or other accessories to clean or use in changing vehicle fluids. There is not need to wipe or clean any part of the container. Residue on the recessed splash screen will seep into the container, thus eliminating the need to wipe or wash any part of the container.

The apparatus allows a user to do as many oil changes, etc. as desired because the container is not a transport-type container, but only used to collect the fluids and transfer to other containers such as the original oil quart containers. This also means that you can do a number of oil changes and store the oil in the original oil quart containers until several cases have accumulated. With the present invention, a user does not have to visit an oil recycling center each time you do an oil change.

By promoting the use of the original oil quart containers for the storage of the used oil, this may help facilitate recycling of the oil containers instead of throwing away the empty bottles in the trash which contain a residue of oil and which do not decompose at landfills.

The apparatus is designed so that when sliding or positioning the container, fluids inside will not splash out, but are redirected back into the container because of the curved housing which ends in the recessed screen area.

BRIEF DESCRIPTION OF THE DRAWINGS

For a further understanding of the nature and objects of the present invention, reference should be had to the following detailed description taken in conjunction with the accompanying drawings, in which like parts are given like reference numerals, and wherein:

FIG. 2 is a side elevation view of the preferred embodiment of the apparatus of the present invention when placed in an upright, generally vertical position;

FIG. 3 is a sectional view taken along lines 3—3 of FIG. 1;

FIG. 4 is an exploded frontal view of a second embodiment of the apparatus of the present invention;

FIG. 5 is a top view of the base portion of the second embodiment of the apparatus of the present invention;

DETAILED DESCRIPTION OF THE PREFERRED EMBODIMENT

Figure 1:
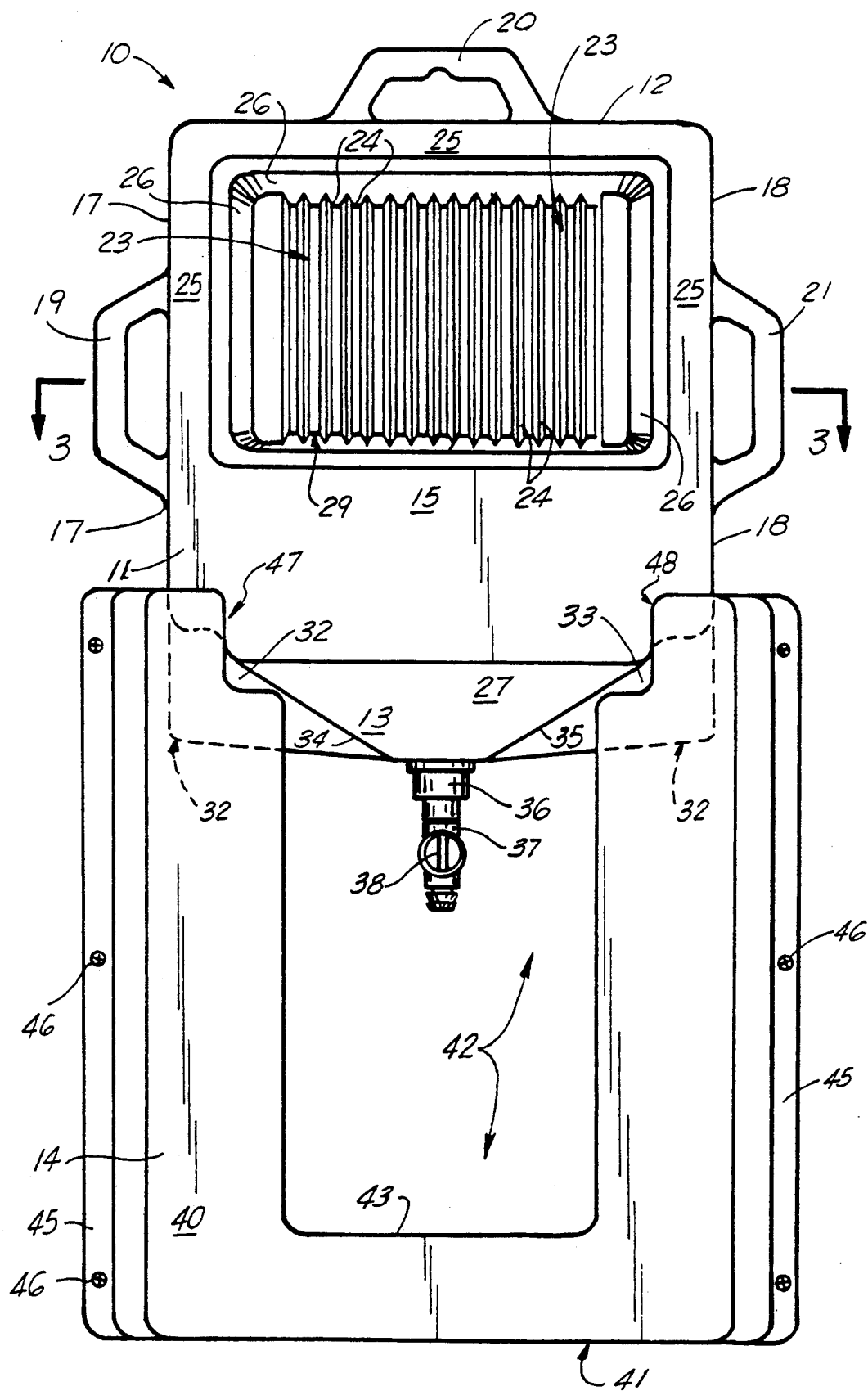
FIG. 1 is a front elevational view of the preferred embodiment of the apparatus of the present invention.

FIGS. 1-3 illustrate the preferred embodiment of the apparatus of the present invention designated generally by the numeral 10.

Vehicle fluids change apparatus 10 includes a vessel body that is generally rectangular shaped. The vessel body 11 includes a top end portion 12 and a bottom end portion 13. The bottom end portion 13 of vessel body il removably registers upon base member 14. The vessel body 11 includes a front surface 15 and a rear surface 16. The surfaces 15, 16 are generally flat and are in generally parallel planes. Side surfaces 17, 18 are generally flat, and parallel to each other, extending along the length of the body between top end 12 portion and bottom end 13 portion. A plurality of handles 19-21 are provided for lifting and handling vessel body Handles 19, 21 are attached to the respective side surfaces 17, 18 for gripping the body 11 and moving it in position underneath a vehicle for example. Handle 21 is attached to the top end 12 of body 11 for lifting body 11 when placing body on or removing body 11 from base 14.

During use, the apparatus is first placed in a generally horizontal position wherein the rear surface 16 abuts an underlying surface such as concrete floor, driveway or the like. The front surface 15 includes an open inlet area 23 into which engine oil (or a like vehicle fluid) can drain from an engine oil pan (or the like). The inlet area 23 can be provided with a plurality of transverse, parallel bars, each bar 24 is preferably triangularly shaped in section, having a tip portion 22 that first receives draining fluid, for minimizing splashing.

Front surface 15 includes a peripheral flange portion 25 that circumvents inlet area 23. Flange 25 includes a shoulder 26 which functions as a chine for redirecting oil back into the reservoir portion 31 to reduce spillage and splashing.

The vessel body 11 provides a hollow interior or closed wall reservoir portion 30 as defined by top end 12, sides 17 and 18, rear wall 16, front surface 15 (including peripheral flange 25) and bottom end portion 13. The lower end portion 13 is tapered, formed by triangularly shaped plates 27, 28 and 34, 35. The interior reservoir 30 is sized to insure that a desired capacity of for example ten (10) quarts is provided below maximum fill line 29 for containing oil when the device is placed in the upright or vertical position of FIG. 1.

Below triangular plates 27, 28 and 34, 35 is drain outlet member 36 to which valve member 37 is affixed for valving the flow of oil from reservoir 31 into a desired container (not shown).

Valve 37 includes a valve handle 38 or other metering device for controlling the flow of fluid from the reservoir 31 so that the user can precisely fill containers 39 almost to capacity before closing the valve structure 37. The valve structure 37 could be a commercially available valve such as a ball valve for example.

The base member 14 is comprised of a pair of base half members 39, 40 which can be assembled by aligning the base members so that the assembly flanges 44, 45 align and abut one another as shown in FIGS. 1 and 2. A plurality of assembly screws 45 can be provided for assembling the base members 39, 40 together. The assembled base member 15 includes an underside 41 for abutting an underlying support surface such as a concrete floor, driveway, or the like. The base 15 provides an open area 42 for accommodating a receptacle such as an empty plastic bottle or the like into which fluid contained within reservoir 30 can be placed. The open area 42 extends below valve 37 when the vessel body 11 is placed upon base 14 as shown in FIG. 1.

Receptacle support surface 43 of base 14 is generally flat so that it can support a receptacle into which drained oil or like engine fluid is to be placed. The upper end of base 14 includes a pair of left and right cradles 47, 48 in the form of recesses that conform to the shape of the lower end 13 portion of vessel body 11. More particularly, the left and right cradles 47, 48 are in the form of recesses that conform to and tightly fit left and right mounting flanges 32, 33 of vessel body 11. Inclined surfaces 49 are provided so that base 14 bottom surface 41 is wide for stability.

The vessel body 11 can be lifted using handle 20 and disengaged from the base member 14 for placement under a vehicle. When the vehicle fluid has been drained into the reservoir 30 by entering the vessel body 11 via inlet area 23, the vessel body 11 is placed in the upright orientation of FIG. 1 after valve member 37 has been closed using valve handle 38. Once in the upright position of FIG. 1, the user simply opens the valve handle 38 until the contained engine oil or like vehicle fluid drains from the reservoir 30 via the drain outlet 36 and through the valve 37 into a receptacle placed under the valve 37.

In the embodiment of FIGS. 4 and 5, a lower capacity apparatus 50 is shown which has an overall height, in combination with base member 60 of less than the vertical height of the embodiment of FIGS. 1-3. This is possible because the maximum fill line 59 is closer to the valve member 68 and drain outlet member 67. In the embodiment of FIGS. 4 and 5, the vehicle fluid change apparatus 50 includes a vessel body 51 having a top 52 and a bottom portion 53. An inlet area 54 is covered with a screen 55 which can be of a desired coarseness. A plurality of handles 56-58 are provided for handling the vessel body 51 as with respect to the embodiment of FIGS. 1-3. Maximum fill line 59 is placed below inlet area 54 as shown in FIG. 4.

Base member 60 includes left and right cradles 61, 62 for receiving left and right side portions of the vessel body 51. Each of the cradles 61, 62 respectively provides a cradle surface 63, 64 with an open area 65 being provided between the cradles 61, 62. Cradle surfaces 63, 64 register with the annular shoulder 70 of vessel body 51 so that the vessel body can be maintained in a generally vertical orientation for filling of receptacles that are placed upon receptacle surface support 66. As with the preferred embodiment of FIGS. 1-3, a drain outlet member 67 is provided for draining the reservoir contained within vessel body 51 as with respect to the embodiment of FIGS. 1-3. Drain outlet member 67 communicates with valve member 68 as well as with the interior reservoir. A valve handle 69 allows the valve member 68 to be opened and closed to valve the flow of fluid from the reservoir.

Figure 6:
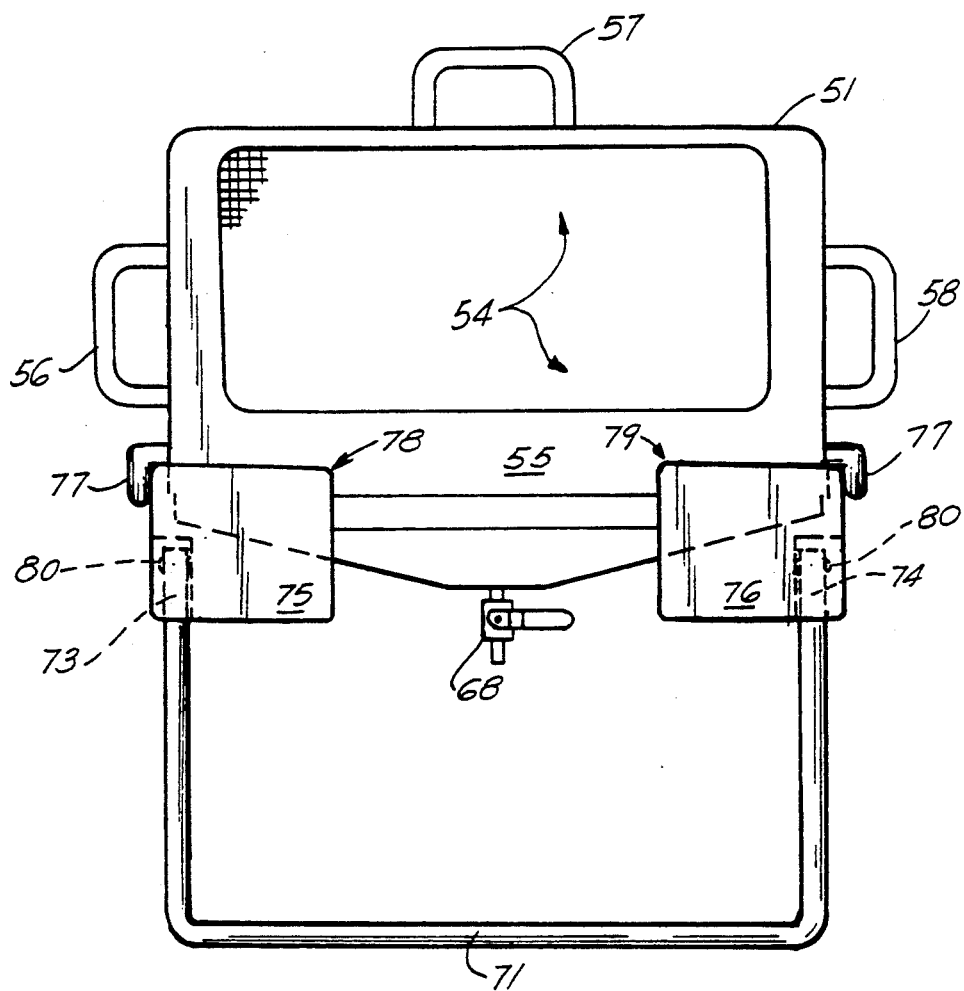
FIG. 6 is an elevational view of a third embodiment of the apparatus of the present invention.
Figure 7:
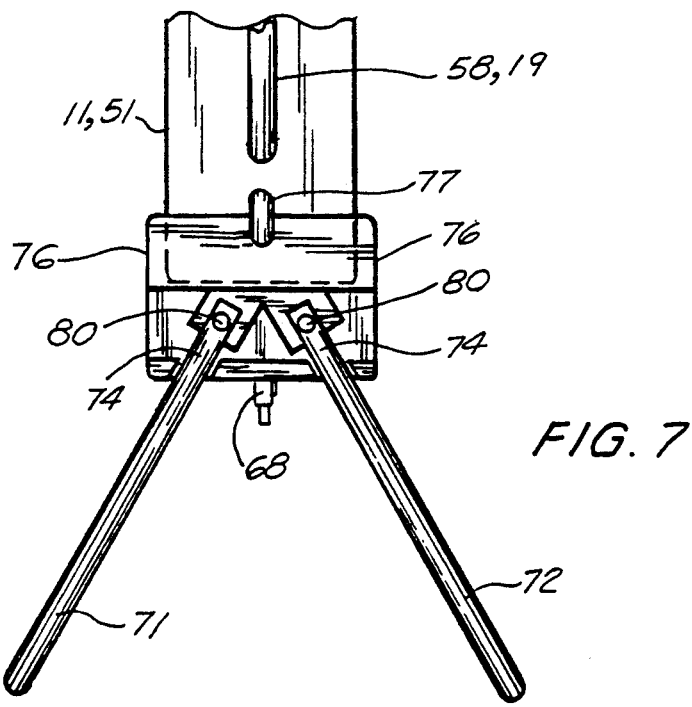
FIG. 7 is a side, fragmentary view of the third embodiment of the apparatus of the present invention.

In the embodiment of FIGS. 6-7, a vessel body 11, 51, is provided that can be constructed in accord with FIGS. 1-3 or 4-5. A pair of C-shaped support legs, 71, 72 attache at left and right leg end portions 73, 74 to left cradle 75 and to right cradle 76. Indexing pins 77 can optionally be provided on vessel body 11, 51 for registering the sides of vessel body 11, 51 to the cradles 75, 76 as shown in FIGS. 6-7. Each cradle 75, 76 has a recess for holding vessel body 11, 51. Left cradle 75 has recess 78 and right cradle 76 has recess 79. The recesses 78, 79 are shaped to conform to the outer surface of the particular vessel body 11, 51 to be supported. Fasteners 80 such as sheet metal screws, bolts, bolted connections, or the like can be used to attach legs 71, 72 to cradle 75, 76. Cradles 75, 76 can be of a plastic material for example.

The apparatus 10 can be made of any suitable structural material such as steel, aluminum, plastic or the like. In the embodiment of FIGS. 6 and 7, the legs 71, 72 can be metallic such as aluminum or steel, for example.

In the following Table 1, the part numbers and part descriptions as used in this written specification and in the accompanying drawings is provided.

TABLE 1

| Part Number | PARTS LIST Description |
|---|---|
| 10 | vehicle fluid change apparatus |
| 11 | vessel body |
| 12 | top of vessel |
| 13 | bottom of vessel |
| 14 | base |
| 15 | front surface |
| 16 | rear surface |
| 17 | side surface |
| 18 | side surface |
| 19 | handle |
| 20 | handle |
| 21 | handle |
| 22 | tip |
| 23 | inlet area |
| 24 | transverse bar |
| 25 | peripheral flange |
| 26 | shoulder |
| 27 | triangularly shaped plate |
| 28 | triangularly shaped plate |
| 29 | fill limit line |
| 30 | closed wall reservoir portion |
| 31 | underside of bars |
| 32 | mounting flange |
| 33 | mounting flange |
| 34 | triangular plate |
| 35 | triangular plate |
| 36 | outlet |
| 37 | valve |
| 38 | valve handle |
| 39 | base half |
| 40 | base half |
| 41 | base underside |
| 42 | open area |
| 43 | receptacle support surface |
| 44 | assembly flange |
| 45 | assembly flange |
| 46 | assembly screws |
| 47 | cradle, left |
| 48 | cradle, right |
| 49 | inclined surface |
| 50 | vehicle fluid change apparatus |
| 51 | vessel body |
| 52 | top |
| 53 | bottom |
| 54 | inlet area |
| 55 | screen |
| 56 | handle |
| 57 | handle |
| 58 | handle |
| 59 | maximum fill line |
| 60 | base member |

TABLE 1-continued

| Part Number | PARTS LIST Description |
|---|---|
| 61 | cradle, left |
| 62 | cradle, right |
| 63 | cradle surface |
| 64 | cradle surface |
| 65 | open area |
| 66 | receptacle support surface |
| 67 | drain outlet member |
| 68 | valve member |
| 69 | valve handle |
| 70 | peripheral shoulder |
| 71 | support leg |
| 72 | support leg |
| 73 | left end |
| 74 | right end |
| 75 | left cradle |
| 76 | right cradle |
| 77 | indexing pin |
| 78 | recess |
| 79 | recess |
| 80 | fastener |

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. An engine oil change and recycle apparatus, comprising:

(a) a vessel body having an interior reservoir for containing oil drained from an engine, the body having parallel front and rear surfaces on opposite sides of the interior reservoir;

(b) the vessel body having an inlet for enabling draining oil to enter the reservoir at the front surface of the vessel body when the vessel body is in a first, horizontal position such that the front surface is substantially horizontal;

(c) a base for enabling the vessel body to be supported in an upright position wherein the front and rear surfaces are generally vertical, the base having a lower portion which contacts a surface on which the base is placed and a recess means shaped to conform to the outer surface of the vessel when the vessel body is in the upright position and is placed in the recess means;

(d) an outlet member that defines a drain for emptying the reservoir when the vessel body is in the upright position;

(e) the vessel body having a closed wall portion that contains drained oil below the inlet when the vessel body is in the upright position;

(f) a valve at the outlet member for controlling flow from the reservoir;

(g) the valve being spaced a sufficient distance above the lower portion of the base when the vessel body is in the upright position and is in the recess means to enable a container to be placed under the valve when the vessel body is in the upright position and in the recess means so that the drained engine oil can be recycled into such container.

2. The apparatus of claim 1 wherein the base includes a pair of spaced apart feet.

3. The apparatus of claim 1 wherein the closed wall portion has an edge portion that communicates with the inlet.

4. The apparatus of claim 1 wherein the vessel body has wall portion that surrounds the inlet when the body is placed in a horizontal position.

5. The apparatus of claim 1 wherein the inlet is a perforated member having multiple openings that allow draining oil to flow through the openings directly into the reservoir.

6. The apparatus of claim 1 wherein the body includes a pair of generally opposite side walls.

7. The apparatus of claim 1 wherein the vessel body has side walls connecting the front and rear walls, a top wall, and the inlet is positioned adjacent the top wall.

8. The apparatus of claim 1 wherein the inlet includes an enlarged opening that extends across at least half the width of the vessel body.

9. The apparatus of claim 1 wherein the volume of the vessel body below the inlet when the vessel body is upright is 10 quarts.

10. A vehicle fluids change and recycle apparatus, comprising:
    (a) a vessel body having an interior reservoir for containing oil drained from an engine, the body having parallel front and rear surfaces on opposite sides of the interior reservoir;
    (b) the vessel body having an inlet for enabling draining oil to enter the reservoir at the front surface of the vessel body when the vessel body is in a first, horizontal position such that the front surface is substantially horizontal;
    (c) a base for enabling the vessel body to be supported in an upright position wherein the front and rear surfaces are generally vertical, the base having a lower portion which contacts a surface on which the base is placed and a recess means shaped to conform to the outer surface of the vessel when the vessel body is in the upright position and is placed in the recess means;
    (d) an outlet member that defines a drain for emptying the reservoir when the vessel body is in the upright position;
    (e) the vessel body having a closed wall portion that contains drained oil below the inlet when the vessel body is in the upright position;
    (f) a valve at the outlet member for controlling flow from the reservoir;
    (g) the valve being spaced portion of the base when the vessel body is in the upright position and is in the recess means to enable a container to be placed under the valve when the vessel body is in the upright position and is in the recess means so that the drained engine oil can be recycled into such container.

11. The apparatus of claim 10 wherein the base includes a pair spaced apart feet.

12. The apparatus of claim 10 wherein the closed wall portion has an edge portion that communicates with the inlet.

13. The apparatus of claim 10 wherein the vessel body has wall portion that surrounds the inlet when the body is placed in a horizontal position.

14. The apparatus of claim 10 wherein the inlet is a perforated member having multiple openings that allow draining oil to flow through the openings directly into the reservoir.

15. The apparatus of claim 10 wherein the body includes a pair of generally opposite side walls.

16. The apparatus of claim 10 wherein the vessel body has side walls connecting the front and rear walls, a top wall, and the inlet is positioned adjacent the top wall.

17. The apparatus of claim 10 wherein the inlet is an enlarged opening that extends across at least half the width of the vessel body.

18. The apparatus of claim 10 wherein the volume of the vessel body below the inlet when the vessel body is upright is 10 quarts.

* * * * *